United States Patent
Miyauchi et al.

[15] 3,635,621
[45] Jan. 18, 1972

[54] APPARATUS FOR CROSSLINKING IN CURABLE RUBBER OR PLASTIC ELECTRIC WIRE AND CABLE

[72] Inventors: Hirokazu Miyauchi, Higashi Osaka; Yasuo Wakabayashi, Settsu, both of Japan

[73] Assignee: Sumitomo Electric Industries, Ltd., Osaka, Japan

[22] Filed: Oct. 28, 1969

[21] Appl. No.: 871,912

Related U.S. Application Data

[62] Division of Ser. No. 644,329, June 7, 1967, Pat. No. 3,513,228.

[52] U.S. Cl. ............................. 425/113, 264/174, 425/174, 425/445
[51] Int. Cl. ............................................................. B29h 5/28
[58] Field of Search ............... 18/6 C, 4 P, 4 S, 5 E; 264/85, 264/174

[56] References Cited

UNITED STATES PATENTS

| 2,023,665 | 12/1935 | Clayton | 18/6 C X |
| 2,252,684 | 8/1941 | Babcock | 18/8 AD UX |
| 2,938,234 | 5/1960 | Slade | 264/85 |
| 2,948,020 | 8/1960 | D'Ascoli | 264/174 X |
| 2,952,870 | 9/1960 | Mark | 18/6 C |
| 3,053,611 | 9/1962 | Griehl | 18/8 QM X |
| 3,143,765 | 8/1964 | Tanis et al. | 18/6 C |

*Primary Examiner*—Robert L. Spicer, Jr.
*Attorney*—Carothers and Carothers

[57] ABSTRACT

An apparatus for curing an insulated conductor which consists basically of a treating chamber sealed from ambient atmosphere and which is divided respectively into a radiant heating zone, a precooling zone and a liquid cooling zone, through which the covered conductor is sequentially passed. The radiant heating zone and the precooling zone are supplied with an inert gas atmosphere under pressure.

5 Claims, 7 Drawing Figures

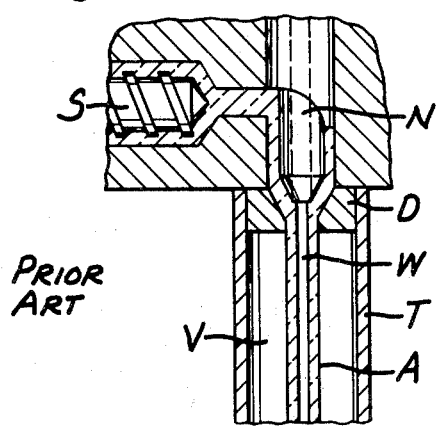
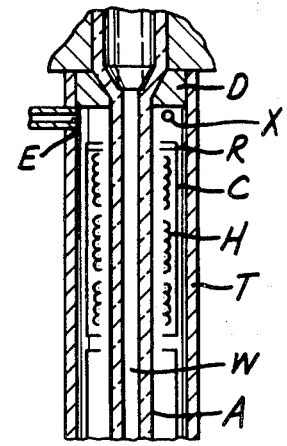
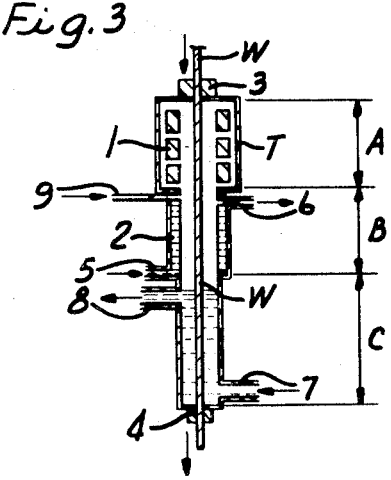
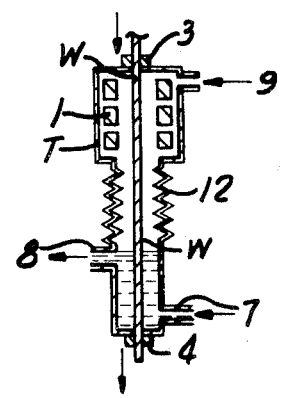
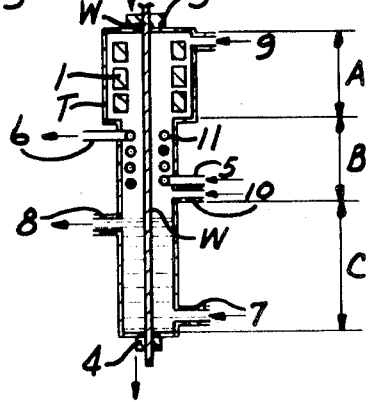

APPARATUS FOR CROSSLINKING IN CURABLE RUBBER OR PLASTIC ELECTRIC WIRE AND CABLE

CROSS-REFERENCE TO RELATED APPLICATION

This is a division of patent application Ser. No. 644,329, now Pat. No. 3,513,228 filed June 7, 1967, entitled "Method of Continuously Curing Rubber of Plastic Coated Conductor and Apparatus Therefor."

BACKGROUND OF INVENTION

The present invention relates to an apparatus for effecting cross-linking in rubber or plastic insulated electric wire.

Saturated steam is commonly used as a heating means for effecting cross-linking in rubber or plastic insulated electric wire. However, the relationship between the pressure and the temperature of saturated steam has a characteristic curve as shown in the drawing of FIG. 7 and the pressure has to be slightly more than 15 kg./cm.$^2$ if the temperature is to be 200° C.

To maintain such a high pressure as 15 kg./cm.$^2$, large-scale equipment is necessary and proves to be expensive. On the other hand, the pressure of 15 kg./cm.$^2$ is excessively high for the mere prevention of foaming at the time of heating. This contradiction is a disadvantage which is unavoidable when saturated steam is used.

Furthermore, when the steam is 200° C. or higher, a pressure increase of 5 kg./cm.$^2$ is required to raise the temperature of the steam by 10° C., as can be seen clearly from the drawing. Even if it is attempted to raise the temperature further for the purpose of expediting cross-linking, the use of saturated steam above 200° C. is not good for practical purposes because thereafter only the pressure advances without a further corresponding increase in heat.

The present invention provides an apparatus for cross-linking rubber and plastics, eliminating the above-mentioned disadvantages found with the use of saturated steam.

SUMMARY OF INVENTION

The apparatus for continuously manufacturing insulated conductors in accordance with the present invention, comprises a covering means for continuously applying a curable rubber or plastic material onto a conductor (such as an extrusive) and a curing chamber sealed from the ambient atmosphere and having means to supply an inert gas atmosphere to the interior thereof under pressure. The chamber is divided into a series of three treating zones consisting respectively of a radiant heating zone, a precooling zone, and a liquid cooling zone. An inlet and outlet is positioned in the chamber to permit the passage of the freshly covered conductor from the covering means or extruders through the series of three zones in the respective order given above. The covered conductor is therefor never exposed to the ambient atmosphere at any time during the curing process.

The radiant heating zone is preferably divided into a plurality of radiant heating stages as provided by a series of two or more radiant heaters which are independently controllable one from the other.

In the apparatus of the present invention, infrared rays are used as a heating means. Infrared rays are obtainable by a simple apparatus and nevertheless readily produce temperatures above 200° C. and enhance cross-linking speed. Since a temperature exceeding 300° C. is likely to degrade rubber and plastics, it is preferable for practical purposes to use a temperature between 200° and 300° C.

With regard to the pressure means, it is necessary to avoid allowing rubber and plastics to come in contact with oxygen because they are apt to get oxidized at high temperatures. An inert gas, such as nitrogen, carbon dioxide, etc., is therefore used. Although a gas pressure of 2 kg./cm.$^2$ or more is sufficient, it is preferable to have a gas pressure of 3 kg./cm.$^2$ or more to prevent foaming at high temperatures, while on the other hand, it is preferably to maintain the gas pressure less than 8 kg./cm.$^2$ from the viewpoint of equipment and other conditions.

Other objects and advantages appear hereinafter in the following description and claims.

The accompanying drawings show for the purposes of exemplification without limiting the invention or claims thereto, certain practical embodiments illustrating the principles of this invention wherein:

FIG. 1 represents the prior art apparatus used for cross-linking cable with extruded insulation.

FIG. 2 is a sectional view in side elevation showing the general embodiment of the present invention utilizing an inert gas environment.

FIG. 3 is a cross-sectional view in side elevation showing the complete apparatus comprising three zones for cross-linking uncured sheathed cable.

FIG. 4 is a cross-sectional view in side elevation of another embodiment of the apparatus comprising this invention similar to FIG. 3 and showing a modified form of a precooling zone.

FIG. 5 is a cross-sectional view in side elevation of another embodiment of the apparatus comprising this invention showing a modified form of precooling zone.

Figure 7:
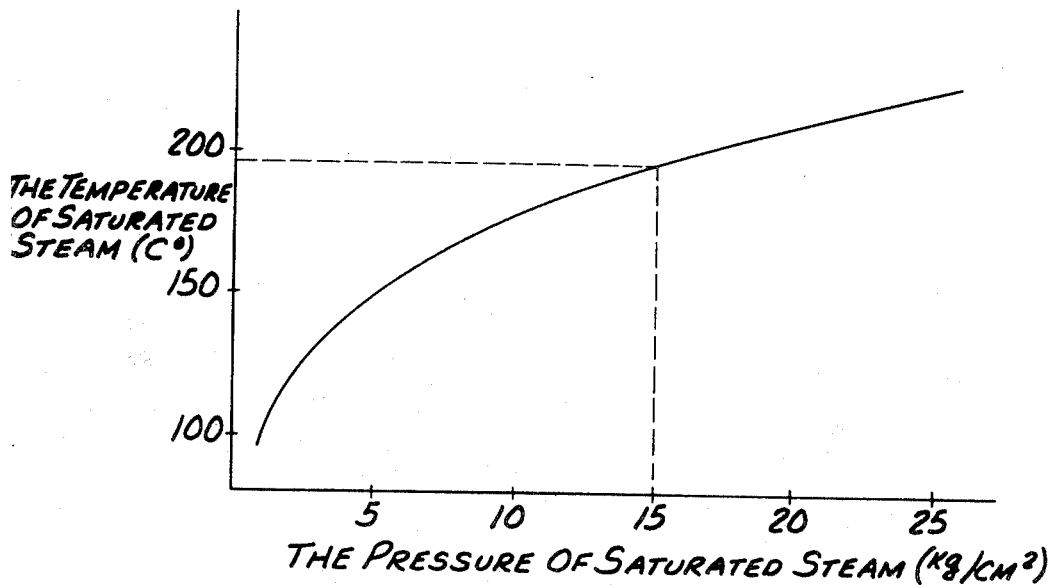
FIG. 7 is a graph illustrating the characteristic curve for temperature versus pressure of saturated steam.

The apparatus for the effecting of cross-linking in rubber or plastics as extended on electric wire according to the present invention will be explained with reference to examples in combination with the figures.

EXAMPLE EMBODIMENT 1

A copper conductor having a nominal cross-sectional area of 22 mm. was covered to a thickness of approximately 3 mm. with an uncured polyethylene compound consisting of 100 phr. (parts per hundred parts resin) of polyethylene having a specific gravity of 0.92 g./cc. and 2 phr. of di-α-cumyl peroxide. It was then heated at 250° C. for 2 minutes with an infrared ray heater in nitrogen gas at a pressure of 1 kg./cm.$^2$, 3 kg./cm.$^2$ and 5 kg./cm.$^2$ respectively. According to the results, when the pressure was 3 kg./cm.$^2$ and 5 kg./cm.$^2$, the insoluble fraction of xylene at 120° C. was 75 percent (representing the degree of cross-linking) and there was no air bubble observed. When the pressure was 1 kg./cm.$^2$, air bubbles were observed.

EXAMPLE EMBODIMENT 2

A copper conductor having a nominal cross-sectional area of 100 mm. was covered to a thickness of approximately 13 mm. with an uncured compound consisting of 100 phr. of polyethylene having a specific gravity of 0.92 g./cc.; 3 phr. of di-α-cumyl peroxide and 0.3 phr. of an antioxidant. It was heated at 250° C. for 25 minutes by infrared ray heaters in nitrogen gas of 3 kg./cm.$^2$ pressure. As a result, complete cross-linking was effected and polyethylene cable entirely free from air bubbles was obtained.

EXAMPLE EMBODIMENT 3

A copper conductor having a diameter of 1.0 mm. was covered to a thickness of 1.0 mm. with an uncured compound consisting of 100 phr. of ethylene polymer containing 8 weight percent of vinyl acetate and 1.5 phr. of 2.5-dimethyl-2.5-di(t-tutyl perioxy) hexane, and was heated at 250° C. for 2 minutes with infrared ray heaters in nitrogen gas of 2 kg./cm.$^2$ pressure.

As a result, cross-linking was effected completely and a highly flexible electric wire with a very transparent insulating layer entirely free from air bubbles was obtained.

In case cross-linking is carried out following the extrusion covering without cooling, the conductor W moves downward through the nipple N, as shown in FIG. 1, and the insulating material supplied by the extruders is shaped by the die D to cover the conductor W, which then enters the curing tube T. In apparatus heretofore used, the curing tube T was filled with a high pressure steam V, which heats and cures the sheath A.

In the case of an apparatus of this kind, the high-pressure steam is in direct contact with the die, so that the die in the neighborhood of the crosshead D becomes higher in temperature. Even if the extrusion is made at an appropriate temperature at the beginning of the operation, excessive heating caused by the steam results as time goes on. As a consequence, a failure may take place during continuous operation of the extruder in that the curing reaction of the insulating material A will take place in the crosshead, which is a detriment to the smooth flow of the plastic material, and results in a decrease in the quantity of extruded material and a consequential decrease in the outer diameter of the insulated wire.

By the embodiment of the present invention illustrated in subsequent figures, however, it is possible to effect the cross-linking of the sheathing material without fear of a failure in the smooth flow of material taking place.

In FIG. 2, D denotes the die, and a protective cover C is provided for the reflective plates R on top and bottom.

The heaters H are housed with the plates R within the cross-linking tube T and radiates infrared rays. The inert gas is supplied into the curing tube T through the opening E.

In this way, the surface of the electric wire is subjected directly to radiant heating by the infrared rays radiated by the heaters H, while the temperature of the inert gas for preventing foaming of sheathing material scarcely even rises. Thus, overheating of the die D and crosshead does not take place. If necessary, the inert gas may be circulated in the tube T to suppress the temperature of the gas in contact with the die. Usually, however, the gas temperature becomes saturated at a low point because of the dissipation of heat from the tube T and other parts, so that it is not particularly necessary to consider the cooling of the gas.

EXAMPLE EMBODIMENT 4

With an apparatus as shown in FIG. 2 in use, a chemically cross-linked polyethylene electric wire was manufactured by extrusion covering and continuous curing, the pressure of the nitrogen gas atmosphere being 5 kg./cm.$^2$.

From the beginning of the operation, the temperature of nitrogen gas at the position X was measured by means of a thermocouple and it was found that the rise in temperature was very little, the temperature being 17° C. before the operation, 45° C. after 30 minutes and 45° C. after 2 hours.

If the conventional method, as shown in FIG. 1, were employed, steam V would be at a temperature of about 200° C. The die D is therefore subjected to heat in quite a different manner. When the method of the present invention was employed, there was no problem in controlling the temperature of the die.

EXAMPLE EMBODIMENT 5

With an apparatus as shown in FIG. 2 in use, an ethylene-propylene elastomer insulated cable having a conductor size of 100 mm. and insulation thickness of 4 mm., was cured.

When the pressure of the nitrogen gas was 8 kg./cm.$^2$ and the radiant heating applied, the temperature of the die D could be controlled and maintained at 90° C. even after continuous operation for seven hours. When steam of 15 kg./cm.$^2$ was used, however, the temperature of the die rose to 110° C. after 30 minutes of operation; scorching occurred after an hour's operation and extrusion became impossible.

In using the apparatus of the present invention for curing in the above mentioned way, it is preferable that the apparatus is such that the uncured core of polyethylene or vulcanized rubber cable is heated for the cross-linking reaction under the pressure of a gas which does not oxidize rubber and plastics and the cable is then cooled and solidified into a finished product by proceeding under pressure through a precooling zone and a water-cooling zone all without exposure to the ambient or exterior atmosphere.

The other embodiments of the present invention as shown in FIGS. 3 through 6 will now be explained in detail.

In FIG. 3, the apparatus, through which the cable core W passes through, starting at the supply packing 3 and passing out the takeup packing 4, comprises three stages, the radiant heating zone A, the precooling zone B, and the water or direct cooling zone C. A radiant heating device such as infrared ray heaters 1 are housed in the radiant heating zone. A water jacket 2 is provided in the precooling zone, cold water being supplied from the inlet 5 and passed out through the outlet 6. In the water cooling zone C, water is brought into direct contact with the cable core W, high-pressure water being supplied from the inlet 7 and passed out through the outlet 8. The inlet 9 is for the entrance of an inert gas, such as nitrogen, carbon dioxide, etc., which will not oxidize rubber or plastic.

The precooling zone B effects the precooling of the heated cable and at the same time condenses any vaporized water from zone C, serving the purpose of preventing the vaporized water from affecting in a detrimental way, the heaters 1 and also of improving the cooling effect, since the high-pressure water for cooling in zone C and the heating zone A are separated by the precooling zone B and the temperature rise of the high-pressure water is made free from the influence of the atmosphere in the heating zone.

The requisite length of the cooling zone is determined in view of the size of the apparatus and the desired line speed. The condensing ability in zone B may be enhanced by using a longer jacket 2 as shown in FIG. 3, or by using a condensing pipe 11 as shown in FIG. 4, or by providing cooling fins 12 as shown in FIG. 5.

A preferable embodiment of this invention is to separate the radiant heating heater into two or more sections so that the temperature of each of the sections may be controlled separately.

Figure 6:
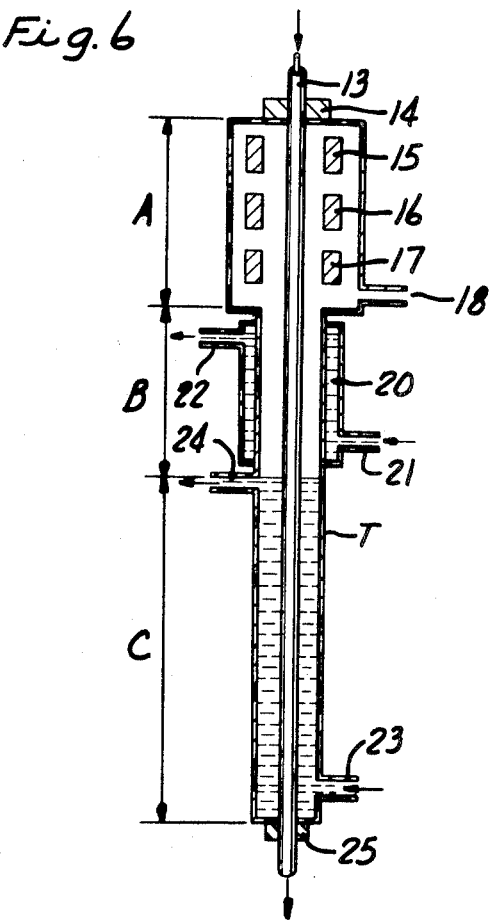
FIG. 6 is a cross-sectional view in side elevation of a preferred embodiment comprising this invention wherein the heating zone A comprises several independent heating stages.

In FIG. 6, the uncured (unvulcanized) plastics or rubber cable 13, which is continuously covered with the insulating material and sent out from the extruder into the curing tube T through the packing 14 on the supply side of the tube T. In case curing is effected immediately after the extrusion-sheathing, the packing 2 is not necessary and the curing tube may be directly joined to the crosshead of the extruder. In the heating zone A, a plurality of stages of infrared ray heaters are provided. In the example shown in FIG. 6, the first stage of the heater is 15, the second stage of the heater is 16, and the third stage of the heater is 17; these stages are provided independent of each other, so that they can be controlled separately.

The inlet 18 is provided for the introduction of inert gas under pressure in the curing tube T at the desired pressure. In the precooling zone B, a precooling jacket 20 surrounds the curing tube T and is provided with the inlet 21 and the outlet 22. In the cooling zone C, water is permitted to circulate from the inlet 23 through the tube T to be discharged at the outlet 24. The cable 13 then passes through the packing 25.

In the above-described structure, the first stage 15 of the heater in the heating zone A is made large enough so that the cable 13 is heated by the supply temperature to a temperature sufficient for the cross-linking vulcanization reaction to take place. The second and subsequent stages will be so made that the temperature of the cable is maintained for a time required to complete the cross-linking vulcanization reaction.

By setting the above mentioned first stage 15 of the heater at a high temperature, the cross-linking vulcanization reaction is accomplished in a much quicker manner, and as a consequence, the manufacturing capability is greatly increased.

Where three or more heater stages in the heating zone are provided, the first and second stages may be used for heating and the rest of the stages may be used for the maintenance of the temperature. The capacity of each stage is to be determined by the cable size, line speed, etc.

EXAMPLE EMBODIMENT 6

Using the structure as shown in FIG. 6, the length of the heating zone was made 2 m., that of the precooling zone 1 m. and that of the cooling zone 4 m. When curing uncured electric wire having a conductor diameter of 22 sq. mm. and insulation thickness of 3.5 mm., the first stage heater was set at 6 kw., the second stage heater at 1.5 kw. and the third stage heater at 1.5 kw. A sufficiently cured cross-linked polyethylene electric wire was obtained with these settings, with the line speed maintained at 3 m./min.

Then the first stage heater was changed to 3.5 kw., the second stage to 3.5 kw. and the third stage to 3.5 kw. Experimenting with this at the same line speed of 3 m./min., it was found that cross-linking was not completed.

Then, again, the first stage, the second stage and the third stage heater were reset at 3 kw. each and the line speed was set at 2.2 m./min., and sufficient cross-linking was effected.

The results obtained indicate that a higher efficiency can be had by controlling the output of the heaters separately even if the electric power supplied to the independent heaters is small.

EXAMPLE EMBODIMENT 7

1. In the case of butyl rubber cable:

Using the same structure as in the example of embodiment 1, the curing of butyl rubber cable and ethylene-propylene-diene terpolymer cable was investigated, and similar results upon curing were obtained.

|     | First Stage Heater | Second Stage Heater | Third Stage Heater | Line Speed |
| --- | --- | --- | --- | --- |
| (a) | 6 Kw. | 2 Kw. | 1 Kw. | 7 m./min. |
| (b) | 3 Kw. | 3 Kw. | 3 Kw. | 5.5 m./min. |

2. In the case of ethylene-propylene rubber cable:

|     | First Stage Heater | Second Stage Heater | Third Stage Heater | Line Speed |
| --- | --- | --- | --- | --- |
| (a) | 6 Kw. | 1.5 Kw. | 1.5 Kw. | 4.5 m./min. |
| (b) | 3 Kw. | 3 Kw. | 3 Kw. | 3.5 m./min. |

Similarly cured cables were obtained with settings of (a) and (b).

By separating the heating stages of the cable and maintaining the temperature as described above, it is possible to accelerate the cross-linking curing reaction without having the cable-insulating material reach a temperature above its decomposition temperature. Also, it is possible to increase the line speed.

Furthermore, the total electric power necessary for the heaters is less than that required for a single heater set for uniform heating. There is also another advantage in that the size of the apparatus necessary is far smaller than that required for uniform heating by a single heater set.

The insulating materials that can be cured by the present invention are general cable-insulating materials which require curing, such as polyethylene containing an organic peroxide or the like as a cross-linking agent, polyethylene copolymer requiring cross-linking, ethylene-propylene rubber, butyl rubber, SBR, chloroprene rubber, natural rubber, etc.

We claim:

1. An apparatus for continuously manufacturing an insulated conductor comprising covering means for continuously applying a curable rubber or plastic insulating material onto a conductor, a curing chamber sealed from the ambient atmosphere and having means to supply an inert gas atmosphere thereto under pressure, said chamber being divided into a series of three treating zones consisting respectively of a radiant heating zone provided with radiant heaters and a precooling zone and a liquid cooling zone for containing a liquid coolant, and an inlet and outlet positioned on said chamber to permit the passage of a covered conductor from said covering means through said series of three zones respectively in their given order, said radiant heating zone consisting of a series of a plurality of independently controllable radiant heaters.

2. The apparatus of claim 1 characterized by a liquid inlet and outlet in the cooling zone of said chamber to permit the circulation of a liquid coolant therethrough.

3. The apparatus of claim 1 characterized in that said radiant heaters are infrared heaters.

4. The apparatus of claim 1 characterized by cooling means positioned in said precooling zone to cool the inert gas atmosphere to be contained therein.

5. The apparatus of claim 4 characterized in that said cooling means consists of a liquid coolant jacket surrounding said chamber in said precooling zone and having means to circulate a liquid coolant therethrough.

* * * * *